(12) United States Patent
Narazaki et al.

(10) Patent No.: US 11,371,563 B2
(45) Date of Patent: Jun. 28, 2022

(54) STRUT BEARING AND VEHICLE STRUT SUSPENSION

(71) Applicant: NAKANISHI METAL WORKS CO., LTD., Osaka (JP)

(72) Inventors: Yasuhiro Narazaki, Osaka (JP); Yoshio Horikawa, Osaka (JP); Kohei Shibata, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 0 days.

(21) Appl. No.: 17/190,208

(22) Filed: Mar. 2, 2021

(65) Prior Publication Data

US 2021/0285487 A1 Sep. 16, 2021

(30) Foreign Application Priority Data

Mar. 12, 2020 (JP) .............................. JP2020-043435

(51) Int. Cl.
  *F16C 43/04* (2006.01)
  *F16C 41/04* (2006.01)
  *B60G 15/06* (2006.01)

(52) U.S. Cl.
  CPC .............. *F16C 43/04* (2013.01); *F16C 41/04* (2013.01); *B60G 15/067* (2013.01); *B60G 2204/418* (2013.01); *B60G 2204/45* (2013.01); *B60G 2206/91* (2013.01); *F16C 2326/05* (2013.01)

(58) Field of Classification Search
  CPC ...... F16C 41/04; F16C 43/04; F16C 2226/72; F16C 2326/05; B60G 15/067; B60G 2204/418; B60G 2204/45; B60G 2206/91
  See application file for complete search history.

(56) References Cited

U.S. PATENT DOCUMENTS

| 4,541,744 A | * | 9/1985 | Lederman | ............ F16C 33/7893 |
| | | | | 384/615 |
| 2013/0313766 A1 | * | 11/2013 | Bussit | .................. B60G 15/068 |
| | | | | 156/60 |
| 2022/0063363 A1 | * | 3/2022 | Kang | ...................... F16C 17/04 |

FOREIGN PATENT DOCUMENTS

| JP | 4771293 B2 | 9/2011 |
| WO | 2019119320 A1 | 6/2019 |

* cited by examiner

*Primary Examiner* — Alan B Waits
(74) *Attorney, Agent, or Firm* — Innovation Capital Law Group, LLP; Vic Lin

(57) ABSTRACT

Provided is a strut bearing including an upper case and a lower case that are made of a synthetic resin, and an engaging portion for preventing separation of components which are free from any stress exerted thereon during assembly. The strut bearing includes an outwardly-projecting piece row on an inner diameter side of an upper case, and an inwardly-projecting piece row on an inner diameter side of a lower case. Within a relative pivoting range of the upper and lower cases in a use state of the strut bearing, a detachment preventing engagement portion for preventing the upper and lower cases from being separated from each other in the axial direction is provided. Within a predetermined angle range outside the relative pivoting range, the detachment preventing engagement portion is not present.

3 Claims, 9 Drawing Sheets

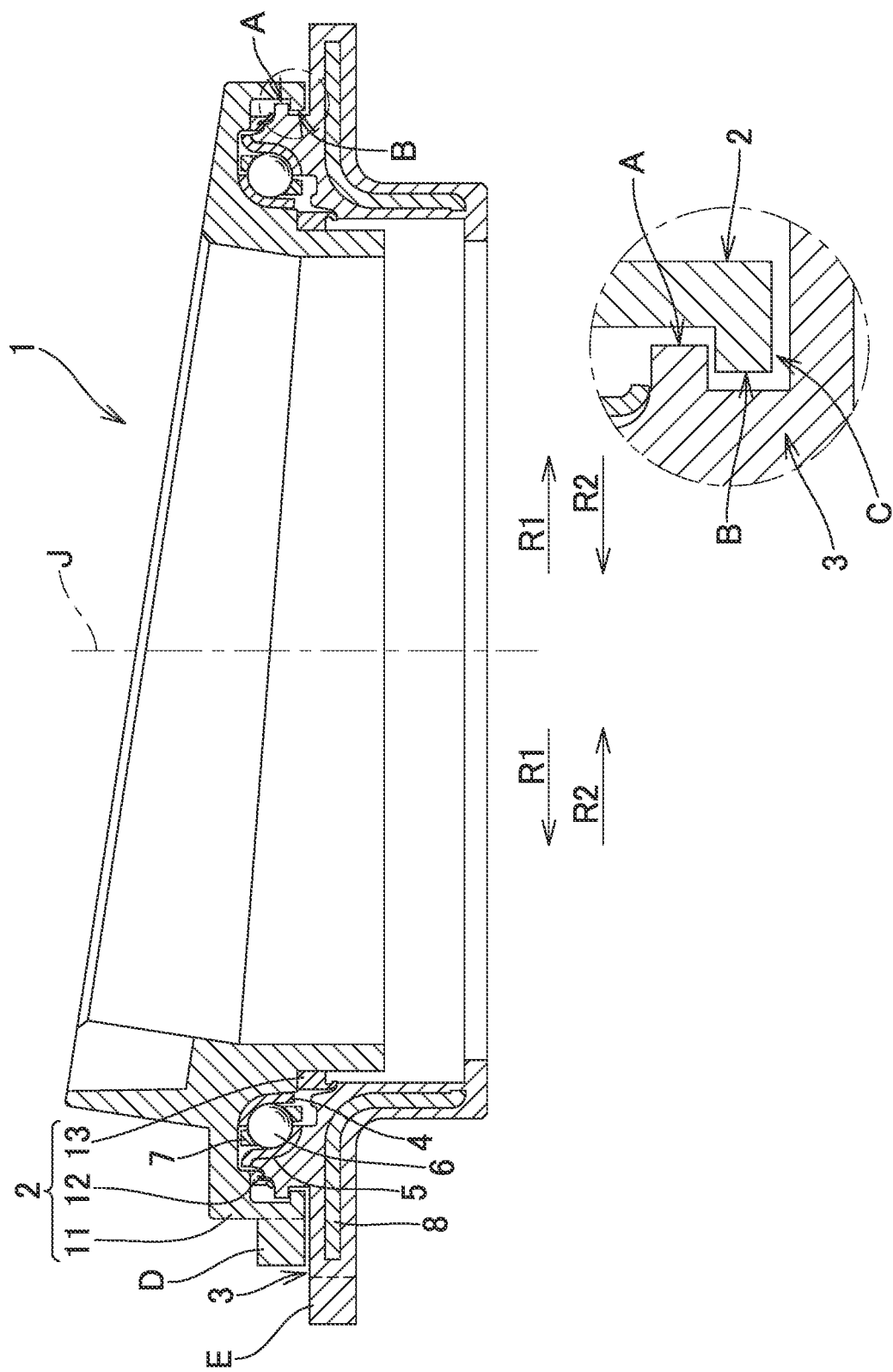

STRUT BEARING AND VEHICLE STRUT SUSPENSION

BACKGROUND OF THE INVENTION

Field of the Invention

The present invention relates to a strut bearing for use in a vehicle strut suspension.

Description of the Background Art

As a suspension supporting a wheel on the body of a vehicle by means of a coil spring and including a shock absorber for absorbing vertical vibrations, there is a strut suspension in which an extendable strut containing a shock absorber is fixed to an axle. The strut suspension is widely used, mainly, for a front wheel of an automobile.

As a strut bearing for use in an upper portion of the strut suspension, there is a strut bearing including an upper case for holding an upper raceway ring and a lower case for holding a lower raceway ring. The upper case and the lower case are made of a synthetic resin (e.g., see Patent Documents 1 and 2).

In such a strut bearing, the upper case and the lower case are assembled together with the upper raceway ring, the lower raceway ring, rolling elements, and the like. Thus, it is necessary for such a strut bearing to take measures for preventing separation of the components during transportation or the like. As the method for preventing the separation, it is common to use a snap fit in which an engaging portion is formed on each of the upper case and the lower case made of a synthetic resin, and the upper case and the lower case are engaged with each other by elastically deforming the engaging portion of one or both of the upper case and the lower case (e.g., see Patent Documents 1 and 2).

In Patent Document 1, the engaging portion of an upper cap element 22 corresponds to claw elements 36 protruding toward the axis of the upper cap element 22, and the engaging portion of a lower cap element 17 corresponds to a groove portion 41 provided on the entire outer circumference of the lower cap element 17. The claw elements 36 of the upper cap element 22 are engaged with the groove portion 41 on the outer circumference of the lower cap element 17 while the claw elements 36 are elastically deformed ([0027]-[0028], FIG. 3 of Patent Document 1).

In Patent Document 2, the engaging portion of a cap 10 corresponds to an inner lower hook 14 and an outer lower hook 19, and the engaging portion of a guide ring 60 corresponds to an inner upper hook 63 and an outer upper hook 66. The inner lower hook 14 of the cap 10 is engaged with the inner upper hook 63 of the guide ring 60 and the outer lower hook 19 of the cap 10 is engaged with the outer upper hook 66 of the guide ring 60 while mainly the inner lower hook 14 and the outer lower hook 19 of the cap 10 are elastically deformed (FIG. 2 of Patent Document 2).

CITATION LIST

Patent Documents

[Patent Document 1] Japanese Patent No. 4771293
[Patent Document 2] WO 2019/119320

In the configuration in which the engaging portion is formed in each of the upper case and the lower case made of a synthetic resin and the upper case and the lower case are engaged by elastically deforming the engaging portion of one or both of the upper case and the lower case, the stress exerted on the engaging portion increases if the elastically deforming force of the engaging portion is increased in order to reliably prevent the separation. This may cause plastic deformation in the engaging portion, or lead to damage to the engaging portion.

SUMMARY OF THE INVENTION

An object of the present invention is to provide a strut bearing including an upper case and a lower case that are made of a synthetic resin, and an engaging portion for preventing separation of the components during transportation or the like. In the strut bearing, no stress is exerted on the engaging portion during assembly of the upper case and the lower case, whereby the concern of plastic deformation or damage of engaging portion is eliminated.

The subject matter of the present invention is as follows.

(1)
A strut bearing including:
an upper case to be fixed to an upper end portion of a strut of a vehicle strut suspension;
a lower case to be directly or indirectly connected to a coil spring disposed on an outer side of the strut;
an upper raceway ring held by the upper case;
a lower raceway ring held by the lower case; and
a rolling element that rolls between the upper raceway ring and the lower raceway ring,
the upper case and the lower case being made of a synthetic resin, in which
within a relative pivoting range of the upper case and the lower case in a use state of the strut bearing, a detachment preventing engagement portion for preventing the upper case and the lower case from being separated from each other in an axial direction is provided, and
within a predetermined angle range outside the relative pivoting range, the detachment preventing engagement portion is not present.

(2)
The strut bearing according to (1), including:
on an inner diameter side of the upper case,
an outwardly projecting piece that projects in a radially outward direction, or an outwardly-projecting piece row formed by a plurality of the outwardly projecting pieces provided discontinuously in a circumferential direction; and
on an inner diameter side of the lower case,
an inwardly projecting piece that projects in a radially inward direction, or an inwardly-projecting piece row formed by a plurality of the inwardly projecting pieces provided discontinuously in the circumferential direction, in which
within the relative pivoting range of the upper case and the lower case in the use state of the strut bearing,
the detachment preventing engagement portion is provided by the outwardly projecting piece or the outwardly-projecting piece row of the upper case, and the inwardly projecting piece or the inwardly-projecting piece row of the lower case.

(3)
The strut bearing according to (1), including:
on an outer diameter side of the upper case,
an inwardly projecting piece that projects in a radially inward direction, or an inwardly-projecting piece row formed by a plurality of the inwardly projecting pieces provided discontinuously in a circumferential direction; and
on an outer diameter side of the lower case, an outwardly projecting piece that projects in a radially outward direction, or an outwardly-projecting piece row formed by a plurality of the outwardly projecting pieces provided discontinuously in the circumferential direction, in which within the relative pivoting range of the upper case and the lower case in the use state of the strut bearing, the detachment preventing engagement portion is provided by the inwardly projecting piece or the inwardly-projecting piece row of the upper case, and the outwardly projecting piece or the outwardly-projecting piece row of the lower case.

(4)

The strut bearing according to (1), including:

on an outer diameter side of the upper case, an outwardly projecting piece that projects in a radially outward direction, or an outwardly-projecting piece row formed by a plurality of the outwardly projecting pieces provided discontinuously in a circumferential direction; and on an outer diameter side of the lower case, an inwardly projecting piece that projects in a radially inward direction, or an inwardly-projecting piece row formed by a plurality of the inwardly projecting pieces provided discontinuously in the circumferential direction, in which within the relative pivoting range of the upper case and the lower case in the use state of the strut bearing, the detachment preventing engagement portion is provided by the outwardly projecting piece or the outwardly-projecting piece row of the upper case, and the inwardly projecting piece or the inwardly-projecting piece row of the lower case.

With the above-described strut bearing according to the present invention, when the upper case is relatively moved toward the lower case in the axial direction so as to be assembled to the lower case, the upper case and the lower case are set within a predetermined angle range other than the relative pivoting range of the upper case and the lower case in the use state of the strut bearing. Thus, the detachment preventing engagement portion is not present, so that the upper case and the lower case can be brought close to each other in the axial direction to be assembled together. Accordingly, a member to be elastically deformed when the upper case and the lower case are assembled is not present, and no stress is exerted. Therefore, it is possible to eliminate the concern of plastic deform or damage of the member.

Within the relative pivoting range of the upper case and the lower case in the use state of the strut bearing, the detachment preventing engagement portion for preventing the upper case and the lower case from being separated from each other in the axial direction is provided. Therefore, it is possible to prevent separation of the upper case and the lower case. When two or more detachment preventing engagement portions are provided, separation of the upper case and the lower case can be more stably prevented against twisting or biasing during assembly/removal of the strut suspension to/from the vehicle body.

Moreover, it is not necessary to achieve engagement by elastically deforming the outwardly projecting piece or the outwardly-projecting piece row, and the inwardly projecting piece or the inwardly-projecting piece row. Therefore, it is easy to increase the thickness of these components in the axial direction, thereby increasing the flexural rigidity. Accordingly, the load for detachment prevention can be increased, and it is therefore possible to reliably prevent separation of the components of the strut bearing during transportation or the like.

Furthermore, the upper case and the lower case are set within the predetermined angle range other than the relative pivoting range of the upper case and the lower case in a use state of the strut bearing. This positioning eliminates the detachment preventing engagement portion. Accordingly, the upper case and the lower case can be easily separated. Therefore, it is possible to improve the ease in maintenance of the strut bearing.

BRIEF DESCRIPTION OF THE DRAWINGS

FIG. 9 is a vertical cross-sectional view of a strut bearing, showing an example in which the outwardly-projecting piece row is provided on the outer diameter side of the upper case, and the inwardly-projecting piece row is provided on the outer diameter side of the lower case.

DESCRIPTION OF THE PREFERRED EMBODIMENTS

Hereinafter, embodiments according to the present invention will be described with reference to the drawings.

Figure 2:
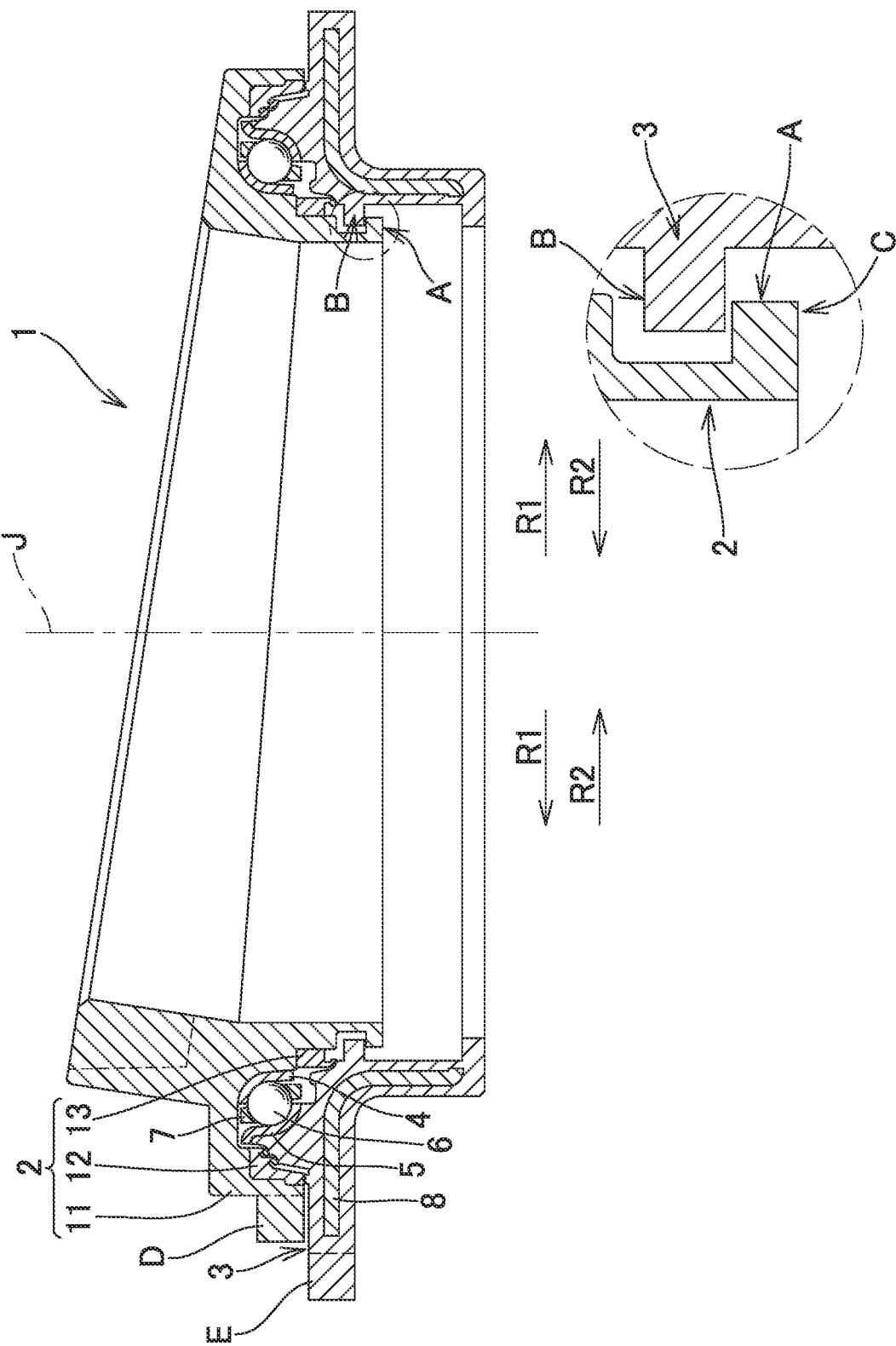
FIG. 2 is a vertical cross-sectional view of the strut bearing.

In the description, the direction of a rotation axis J (see FIGS. 2 and 9) of a strut bearing 1 is referred to as "axial direction", a direction orthogonal to the axial direction and extending away from the rotation axis J is referred to as "radially outward direction" (see the direction indicated by an arrow R1 in FIGS. 2 and 9, for example), and a direction orthogonal to the axial direction and extending toward the rotation axis J is referred to as "radially inward direction" (see the direction indicated by an arrow R2 in FIGS. 2 and 9, for example). When the axial direction is referred to as a vertical direction, a horizontal direction orthogonal to a radial direction around the rotation axis J is referred to as "circumferential direction".

<Strut Suspension>

Figure 1:
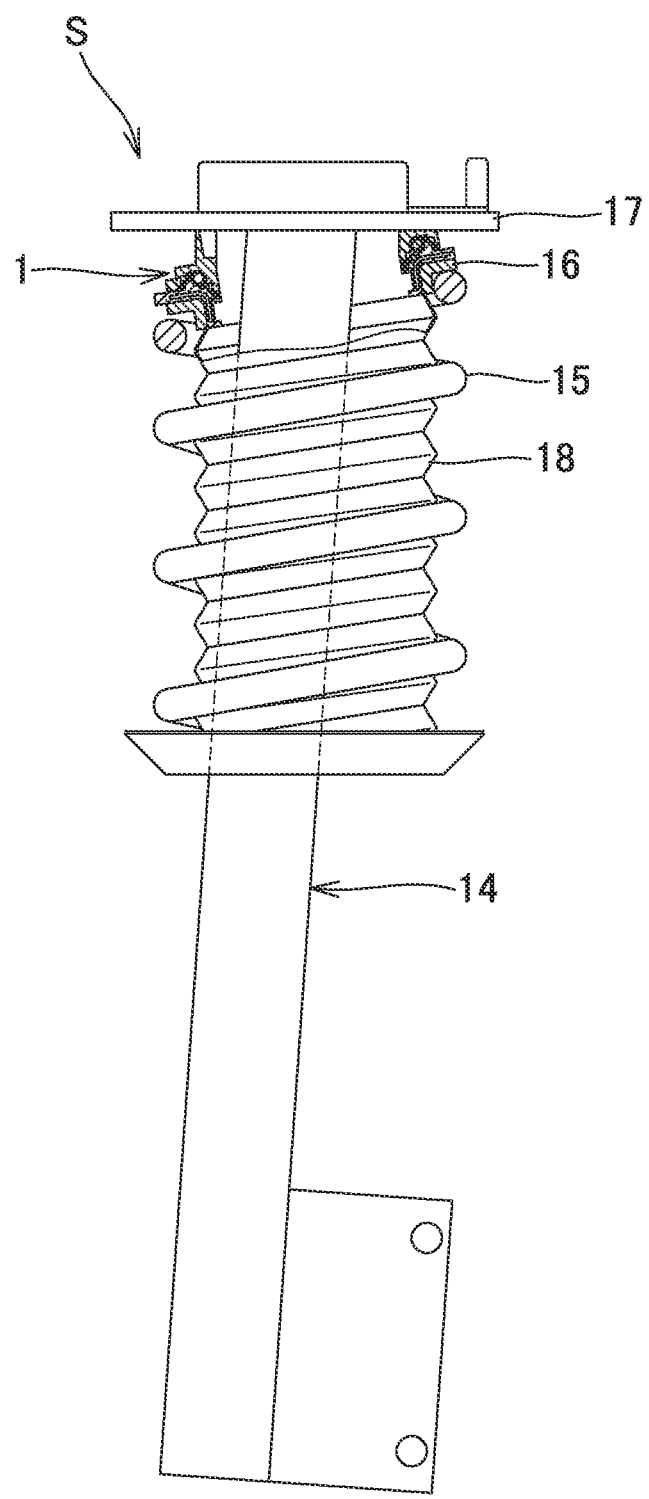
FIG. 1 is a schematic partial cross-sectional view of a vehicle strut suspension including a strut bearing according to an embodiment of the present invention.

A vehicle strut suspension S shown in the schematic view of FIG. 1 is used in a state where an extendable strut 14 containing a shock absorber is fixed to an axle (not shown) and an upper mount 17 is fixed to the body of a vehicle.

An upper portion of the strut suspension S is provided with a strut bearing 1 that is swingably rotated by an amount corresponding to the amount of change in the direction of a steering wheel due to steering operation, while supporting the vehicle body. The swing angle of the strut bearing 1 is defined so as to correspond to an allowable steering angle of a wheel, and is set in a range 40° or more and 50° or less, for example.

A coil spring 15, which is a suspension spring, and a dust boot 18 for protecting an oil seal of the shock absorber from foreign substances such as sand are provided on the outer side of the strut 14. The strut suspension S includes a spring insulator 16 formed of an elastic body such as rubber on a support surface, of a lower case 3 (FIG. 2), which supports the coil spring 15.

<Strut Bearing>

As shown in the schematic view of FIG. 1 and the vertical cross-sectional view of FIG. 2, the strut bearing 1 includes an upper case 2 fixed to an upper end portion of the strut 14, a lower case 3 connected to the coil spring 15 via the spring insulator 16, an upper raceway ring 4 held by the upper case 2, a lower raceway ring 5 held by the lower case 3, and rolling elements 6 that roll between the upper raceway ring 4 and the lower raceway ring 5. The rolling elements 6 are held by a retainer 7 such that the adjacent rolling elements 6 do not come into contact with each other.

As shown in the vertical cross-sectional view of FIG. 2, the upper case 2 includes, on the inner diameter side thereof, a row A formed of circumferentially-arranged outwardly projecting pieces (referred to as a "piece row A"), and the lower case 3 includes, on the inner diameter side thereof, a row B formed of circumferentially-arranged inwardly projecting pieces (referred to as a "piece row B"). The piece row A and the piece row B define a detachment preventing engagement portion C which can prevent, within a relative pivoting range of the upper case 2 and the lower case 3, separation of the assembled components including the upper case 2, the lower case 3, the upper raceway ring 4, the lower raceway ring 5, the rolling elements 6, and the like, during transportation or the like.

The upper raceway ring 4 and the lower raceway ring 5 are made of steel, and the upper case 2 and the lower case 3 are made of a synthetic resin. The upper case 2 includes a base 11 that is made of a synthetic resin and is hard, and an outer diameter-side sealing member 12 and an inner diameter-side sealing member 13 that are made of an elastomer and are soft. The lower case 3 is made of a synthetic resin, is hard, and houses therein a core metal 8 made of steel.

The synthetic resin forming the upper case 2 and the lower case 3 is, for example, a polyamide-based synthetic resin (PA 66, PA 46, PA 612, PA 6, PA 9T, PA 10T, or the like), and contains, for example, 20 to 60 wt % of glass fiber (GF) as reinforced fiber.

Examples of the above-described elastomer forming the outer diameter-side sealing member 12 and the inner diameter-side sealing member 13 include: TPS (styrene-based elastomer), TPO (olefin-based elastomer), TPU (urethane-based elastomer), TPA (amide-based elastomer), and TPEE (ester-based elastomer) as thermoplastic elastomers (TPE); and nitrile rubber (NBR), hydrogenated nitrile rubber (HNBR), acrylic rubber (ACM), ethylene-acrylic rubber (AEM), fluorine rubber (FKM, FPM), and silicone rubber (VQM) as rubber materials. One of the rubber materials may be used, or two or more of the rubber materials may be suitably blended for use.

Examples of the above-described steel forming the core metal 8 include a cold-rolled steel sheet (SPCC, SPCD, SPCE, etc.), a hot-rolled steel sheet (SPHC, SPHD, SPHE, etc.), and a high-tensile steel sheet (SPFC 490, SPFC 590, etc.).

<Details of Row Formed of Circumferentially-Arranged Outwardly Projecting Pieces and a Row Formed of Circumferentially-Arranged Inwardly Projecting Pieces>

As shown in the schematic transverse cross-sectional views of FIGS. 3 to 6, the piece row A is formed of outwardly projecting pieces 9A to 9E which project in the radially outward direction R1 and are provided discontinuously in the circumferential direction on the inner diameter side of the upper case 2, and the piece row B is formed of inwardly projecting pieces 10A to 10E which project in the radially inward direction R2 and are provided discontinuously in the circumferential direction on the inner diameter side of the lower case 3.

Figure 3:
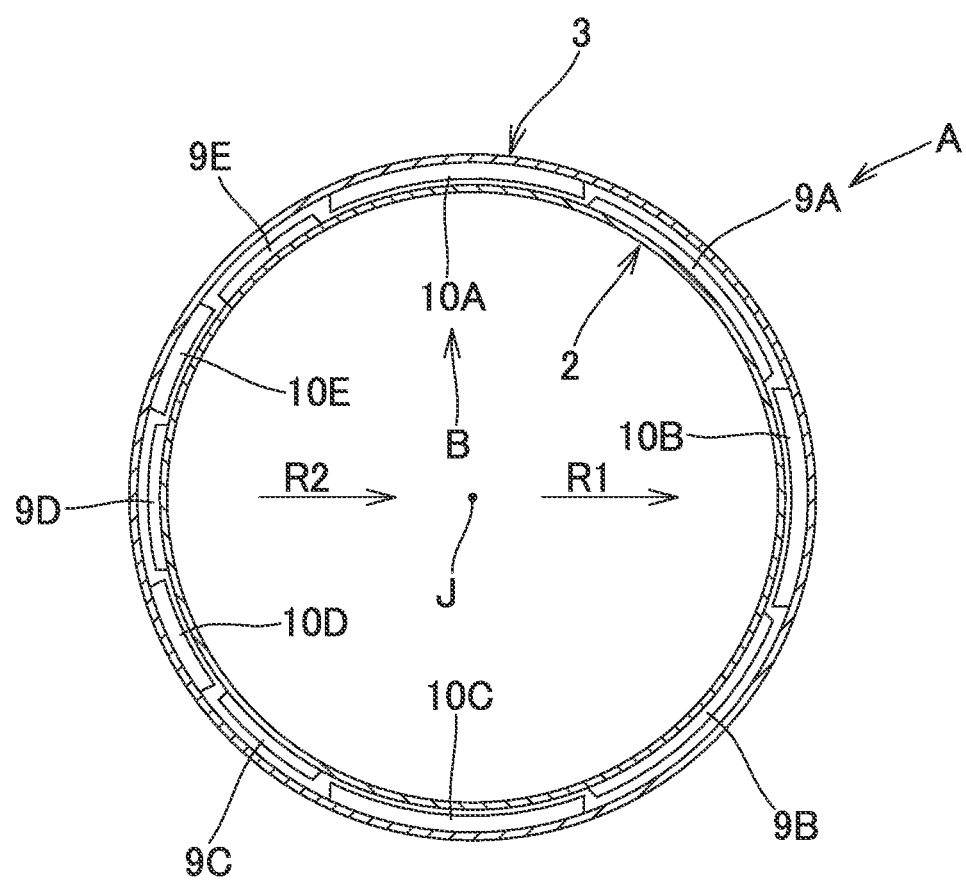
FIG. 3 is a schematic transverse cross-sectional view showing a row of circumferentially-arranged outwardly projecting pieces and a row of circumferentially-arranged inwardly projecting pieces when an upper case and a lower case are relatively brought close to each other in an axial direction so as to be assembled together.

The schematic transverse cross-sectional view of FIG. 3 shows the piece row A and the piece row B when the upper case 2 is relatively moved toward the lower case 3 in the axial direction so as to be assembled to the lower case 3.

FIG. 3 shows a state where the upper case 2 and the lower case 3 are in a predetermined angle range different from the relative pivoting range of the upper case 2 and the lower case 3 in a use state of the strut bearing 1, and a detachment preventing engagement portion C (FIGS. 4 to 6), which will be described later, is not present.

Accordingly, when the upper case 2 is relatively moved toward the lower case 3 in the axial direction so as to be assembled to the lower case 3, as shown in FIG. 3, the outwardly projecting piece is inserted between the inwardly projecting pieces that are adjacent in the circumferential direction. Specifically, the outwardly projecting piece 9A is inserted between the inwardly projecting pieces 10A and 10B that are adjacent in the circumferential direction, the outwardly projecting piece 9B is inserted between the inwardly projecting pieces 10B and 10C that are adjacent in the circumferential direction, the outwardly projecting piece 9C is inserted between the inwardly projecting pieces 10C and 10D that are adjacent in the circumferential direction, the outwardly projecting piece 9D is inserted between the inwardly projecting pieces 10D and 10E that are adjacent in the circumferential direction, and the outwardly projecting piece 9E is inserted between the inwardly projecting pieces 10E and 10A that are adjacent in the circumferential direction.

In a state where the upper case 2 is assembled to the lower case 3 as shown in the vertical cross-sectional view of FIG. 2, the piece row A (outwardly projecting pieces 9A to 9E) is located below the piece row B (inwardly projecting pieces 10A to 10E).

Figure 4:
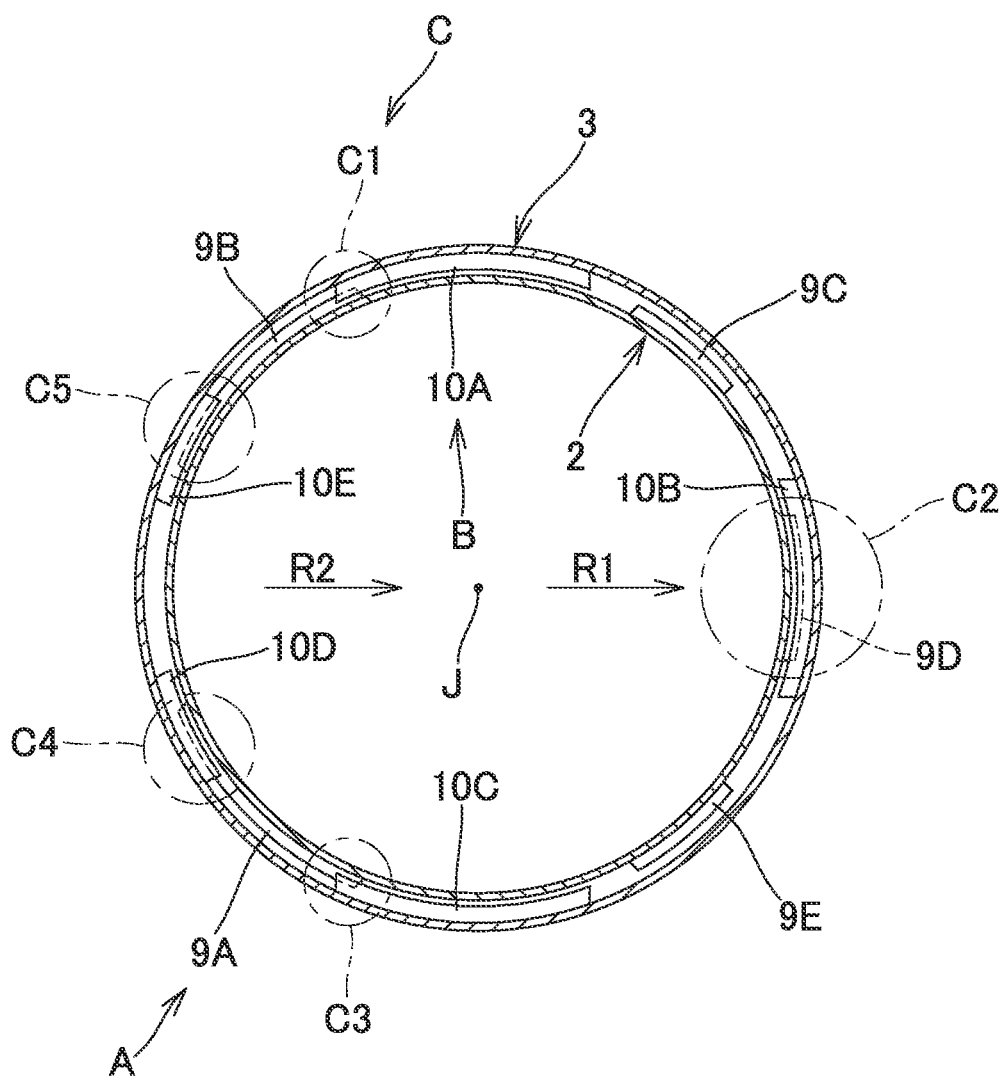
FIG. 4 is a schematic transverse cross-sectional view showing the outwardly-projecting piece row and the inwardly-projecting piece row at an initial set position at which the upper case is assembled to the lower case, and the upper case is pivoted relative to the lower case by a predetermined angle in a circumferential direction.

The schematic transverse cross-sectional view of FIG. 4 shows the piece row A and the piece row B at an initial set position at which the upper case 2 is assembled to the lower case 3 and the upper case 2 is pivoted relative to the lower case 3 by a predetermined angle (180° in this embodiment) in the circumferential direction. The initial set position is set by fitting together an initial positioning projection D provided on an outer diameter portion of the upper case 2 and an initial positioning projection E provided on an outer diameter portion of the lower case 3, which are shown in the vertical cross-sectional view of FIG. 2.

In the initial set position shown in FIG. 4, when the upper case 2 and the lower case 3 are attempted to be moved so as to be separated from each other in the axial direction, the piece row A located on the lower side is abutted against the piece row B located on the upper side, at positions spaced apart in the circumferential direction. The positions are defined as the detachment preventing engagement portions C (detachment preventing engagement portions C1 to C5).

Figure 5:
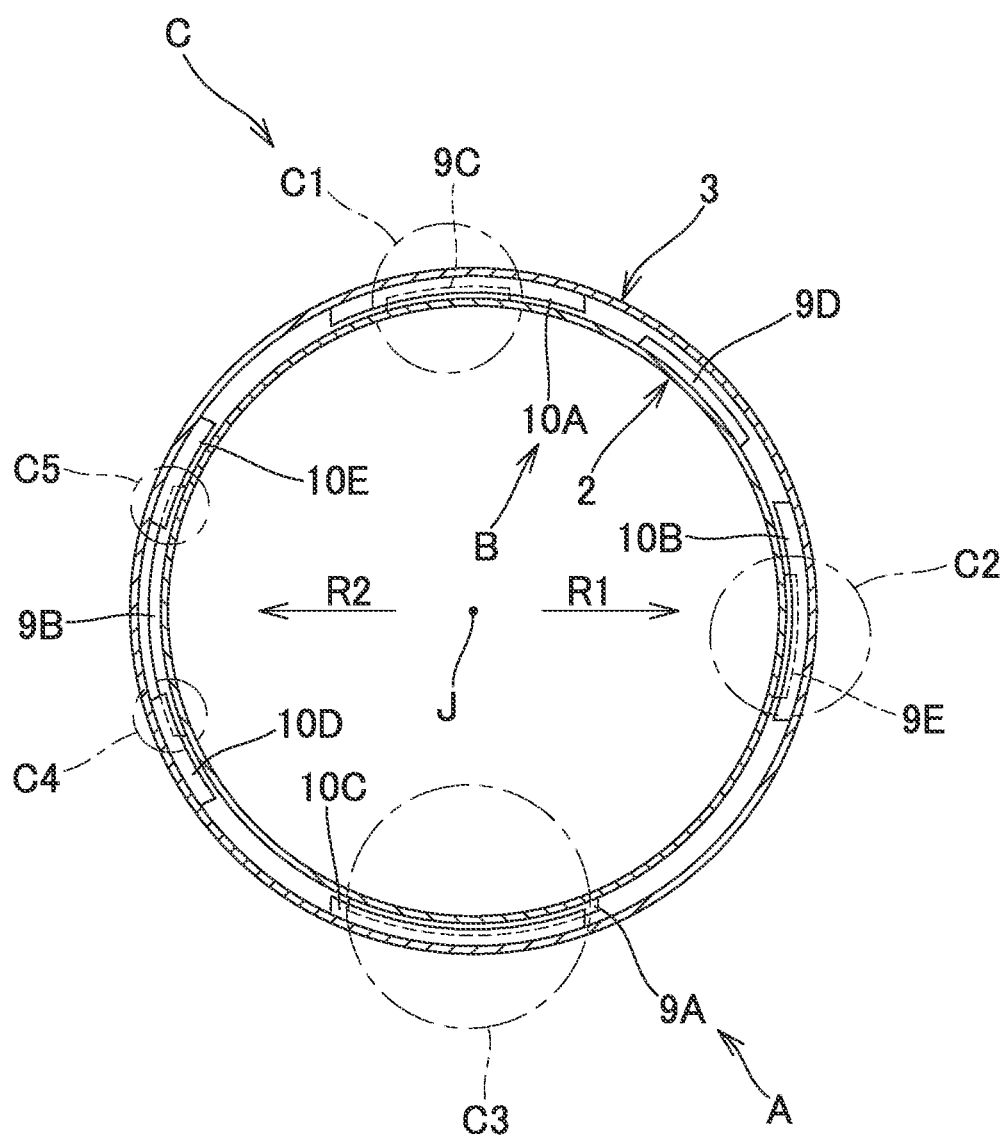
FIG. 5 is a schematic transverse cross-sectional view showing the outwardly-projecting piece row and the inwardly-projecting piece row at one end of a relative pivoting range of the upper case and the lower case in a use state of the strut bearing.

The schematic transverse cross-sectional view of FIG. 5 shows the piece row A and the piece row B at a position (one end of the relative pivoting range of the upper case 2 and the lower case 3 in a use state of the strut bearing 1) at which the upper case 2 is pivoted relative to the lower case 3, for example, by 45° counterclockwise from the initial set position shown in the schematic transverse cross-sectional view of FIG. 4.

In the position of the one end of the relative pivoting range shown in FIG. 5, when the upper case 2 and the lower case 3 are attempted to be moved so as to be separated from each other in the axial direction, the piece row A located on the lower side is abutted against the piece row B located on the upper side at positions spaced apart in the circumferential direction. The positions are defined as the detachment preventing engagement portions C (detachment preventing engagement portions C1 to C5).

Figure 6:
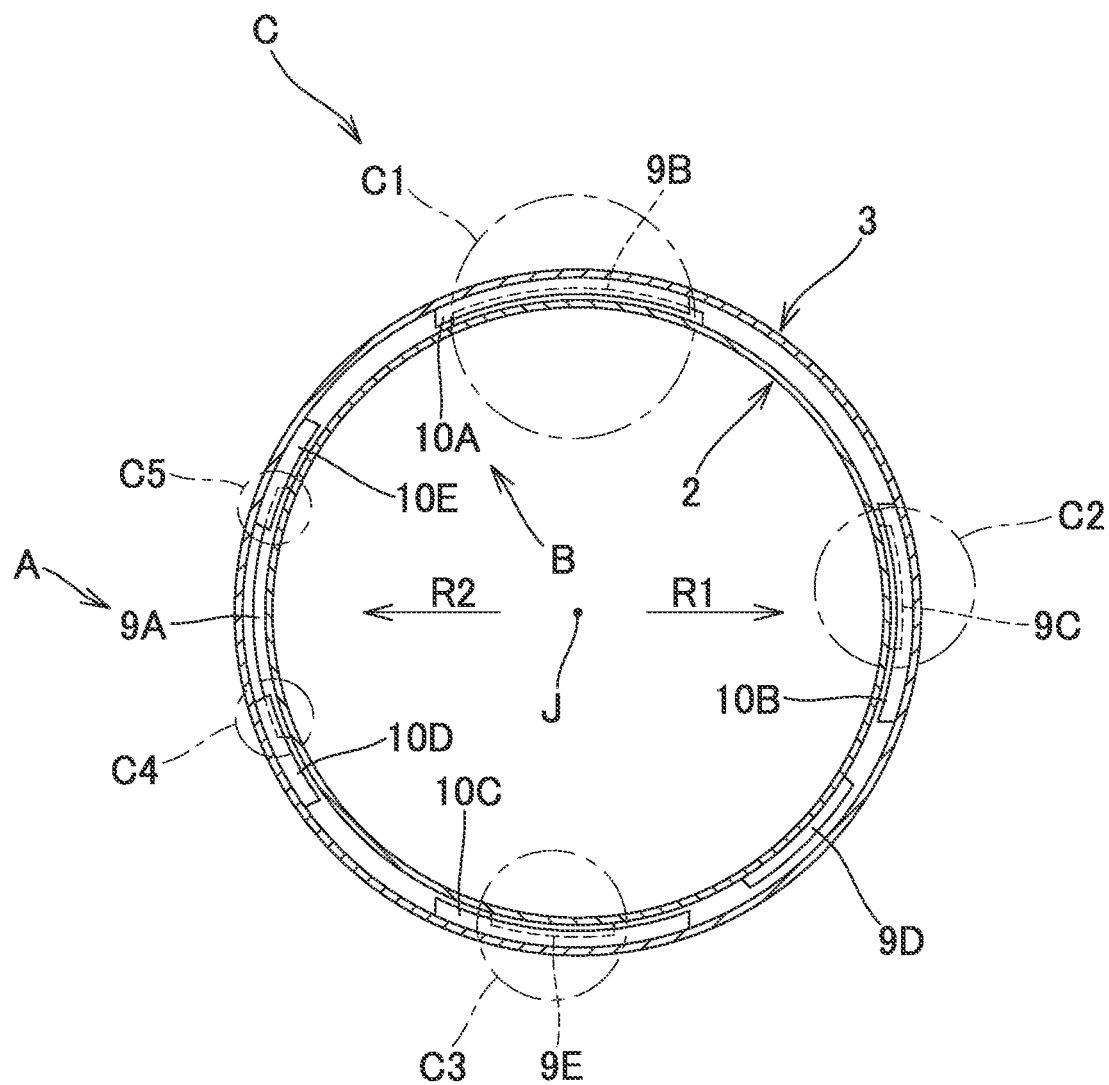
FIG. 6 is a schematic transverse cross-sectional view showing the outwardly-projecting piece row and the inwardly-projecting piece row at the other end of the relative pivoting range.

The schematic transverse cross-sectional view of FIG. 6 shows the piece row A and the piece row B at a position (the other end of the relative pivoting range of the upper case 2 and the lower case 3 in a use state of the strut bearing 1) where the upper case 2 is pivoted relative to the lower case 3, for example, by 45° clockwise from the initial set position shown in the schematic transverse cross-sectional view of FIG. 4.

In the position of the other end of the relative pivoting range shown in FIG. 6, when the upper case 2 and the lower case 3 are attempted to be moved so as to be separated from each other in the axial direction, the piece row A located on the lower side is abutted against the piece row B located on the upper side at positions spaced apart in the circumferential direction. The positions are defined as the detachment preventing engagement portions C (detachment preventing engagement portions C1 to C5).

A sudden change in the road surface condition, such as irregularities on the road surface on which the vehicle using the strut suspension S travels, may cause a large load to be inputted to the strut bearing 1, resulting in a displacement of the upper case 2 and the lower case 3 in the radial direction. In that case, the maximum value of the amount of displacement in the radial direction of the upper case 2 and the lower case 3 is about 0.5 mm. In view of the maximum value of the amount of the displacement, the lower limit of the amount of engagement in the radial direction between the outwardly projecting pieces 9A to 9E and the inwardly projecting pieces 10A to 10E is set to be 0.6 mm or more per side. The upper limit of the above-described amount of engagement is set such that each of the projecting pieces does not interfere with the case facing the projecting piece in the radial direction.

The amount of engagement in the circumferential direction between the outwardly projecting pieces 9A to 9E and the inwardly projecting pieces 10A to 10E is set to be 10% or more of the length of the perimeter of a circle passing through the center of the amount of engagement in the radial direction, within the relative pivoting range of the upper case 2 and the lower case 3 in a use state of the strut bearing 1.

There is concern that the outwardly projecting pieces 9A to 9E and the inwardly projecting pieces 10A to 10E may be damaged by stress exerted by twisting during assembly/removal of the strut suspension S to/from the vehicle body, and stress inadvertently exerted during assembly/disassembly of the strut bearing 1. Thus, the thickness of the outwardly projecting pieces 9A to 9E and the inwardly projecting pieces 10A to 10E at the root thereof is set to be 1.5 mm or more. The maximum value of the thickness may be determined taking the size of the strut bearing 1 into account.

Figure 7:
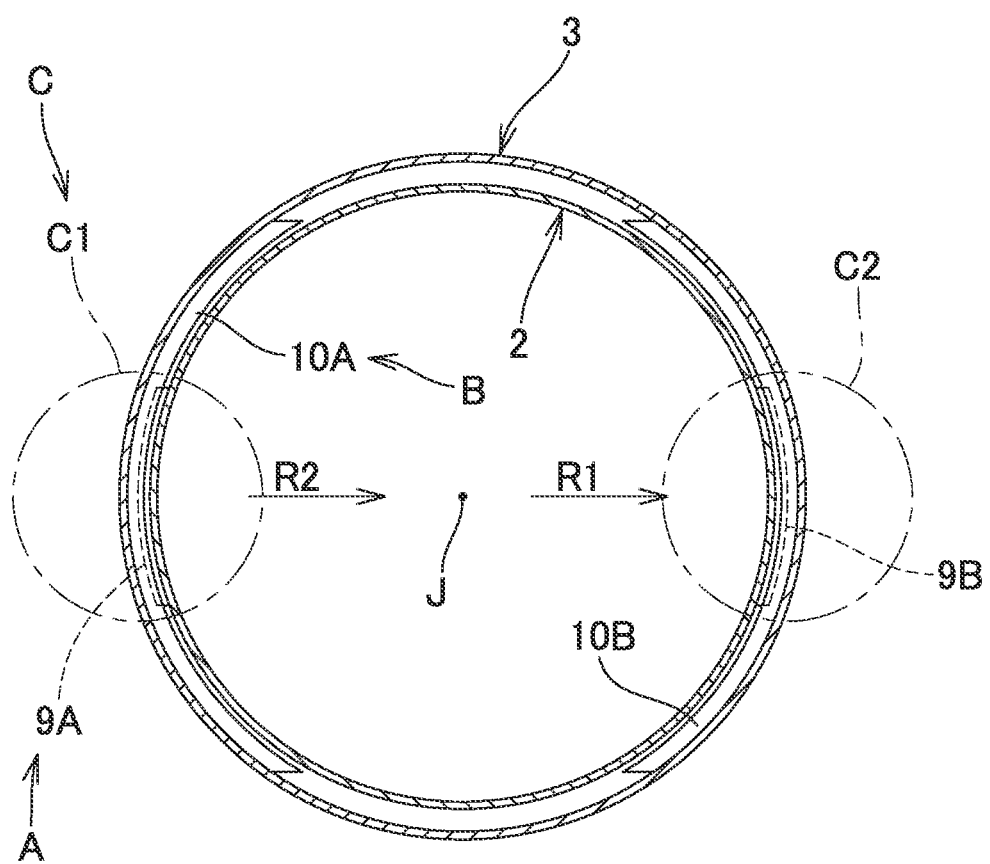
FIG. 7 is a schematic transverse cross-sectional view showing a modification in which the outwardly-projecting piece row is formed by two outwardly projecting pieces, and the inwardly-projecting piece row is formed by two inwardly projecting pieces.

In the examples of the schematic transverse cross-sectional views of FIGS. 3 to 6, the piece row A is formed of five outwardly projecting pieces 9A to 9E, and the piece row B is formed of five inwardly projecting pieces 10A to 10E. As shown in the schematic transverse cross-sectional view of FIG. 7, the piece row A may be formed of two outwardly projecting pieces 9A and 9B, and the piece row B may be formed of two inwardly projecting pieces 10A and 10B. In other words, it is merely required that the piece row A is formed by at least two outwardly projecting pieces, and the piece row B is formed by at least two inwardly projecting pieces. In the modification shown in FIG. 7, the detachment preventing engagement portions C (detachment preventing engagement portions C1 and C2) are present at positions spaced apart in the circumferential direction.

Figure 8:
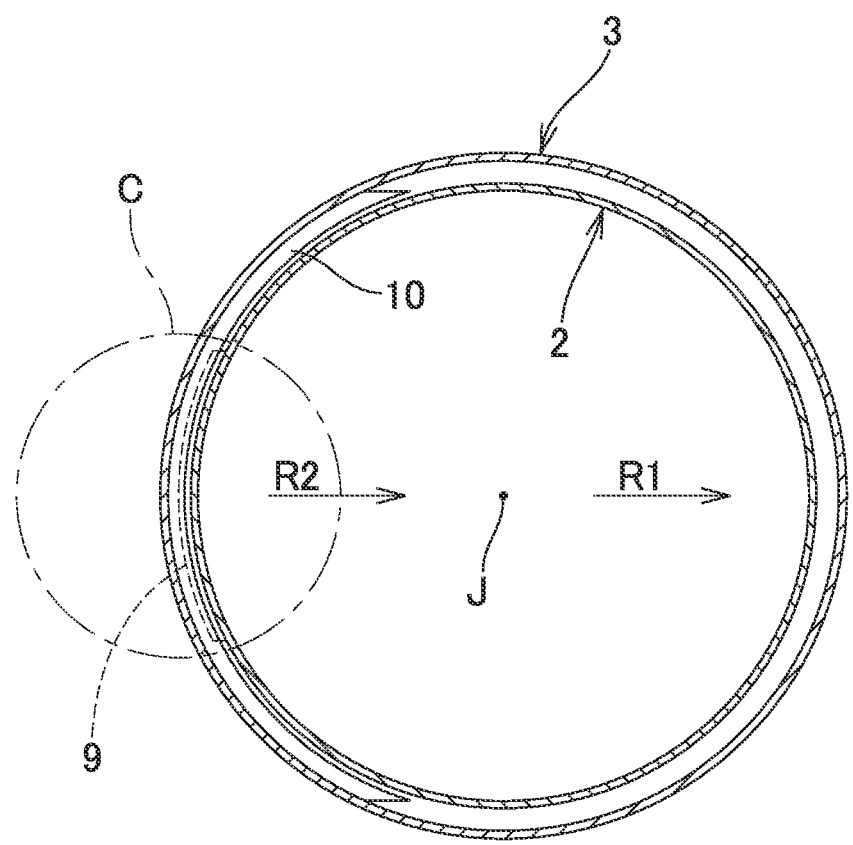
FIG. 8 is a schematic transverse cross-sectional view showing a modification in which a detachment preventing engagement portion is provided by one outwardly projecting piece and one inwardly projecting piece.

Alternatively, the detachment preventing engagement portion C may be formed, not by the piece row A and the piece row B, but by one outwardly projecting piece 9 and one inwardly projecting piece 10 as shown in the schematic transverse cross-sectional view of FIG. 8.

The foregoing description shows examples in which the piece row A or the outwardly projecting piece 9 is provided on the inner diameter side of the upper case 2, and the piece row B or the inwardly projecting piece 10 is provided on the inner diameter side of the lower case 3.

As shown in the vertical cross-sectional view of FIG. 9, the piece row B may be provided on the outer diameter side of the upper case 2, and the piece row A may be provided on the outer diameter side of the lower case 3. Alternatively, one inwardly projecting piece 10 as shown in FIG. 8 may be provided on the outer diameter side of the upper case 2, and one outwardly projecting piece 9 as shown in FIG. 8 may be provided on the outer diameter side of the lower case 3.

In that case, the detachment preventing engagement portion C is provided by the piece row B or the one inwardly projecting piece 10 on the outer diameter side of the upper case 2, and the piece row A or the one outwardly projecting piece 9 on the outer diameter side of the lower case 3.

Alternatively, the piece row A or the outwardly projecting piece 9 may be provided on the outer diameter side of the upper case 2, and the piece row B or the inwardly projecting piece 10 may be provided on the outer diameter side of the lower case 3.

In that case, the detachment preventing engagement portion C is provided by the piece row A or the outwardly projecting piece 9 on the outer diameter side of the upper case 2, and the piece row B or the inwardly projecting piece 10 on the outer diameter side of the lower case 3.

<Effect>

In the strut bearing 1 according to the above-described embodiment of the present invention, when the upper case 2 is relatively moved toward the lower case 3 in the axial direction so as to be assembled to the lower case 3, the upper case 2 and the lower case 3 are positioned within a predetermined angle range (e.g., the state shown in FIG. 3) other than the relative pivoting range of the upper case 2 and the lower case 3 in a use state of the strut bearing 1. This positioning eliminates the detachment preventing engagement portion C, so that the upper case 2 and the lower case 3 can be assembled with being brought close to each other in the axial direction. Accordingly, a member that is elastically deformed when the upper case 2 and the lower case 3 are assembled is not present, and no stress is exerted. Therefore, it is possible to eliminate the concern of plastic deform or damage of the member.

Within the relative pivoting range of the upper case 2 and the lower case 3 in a use state of the strut bearing 1, the detachment preventing engagement portion C for preventing the upper case and the lower case from being separated from each other in the axial direction is provided. Therefore, it is possible to prevent separation between the upper case 2 and the lower case 3. When two or more detachment preventing engagement portions C are provided, separation of the upper case 2 and the lower case 3 can be more stably prevented against twisting or biasing during assembly/removal of the strut suspension S to/from the vehicle body.

Moreover, it is not necessary to achieve engagement by elastically deforming the piece row A or the outwardly projecting piece 9, or the piece row B or the inwardly projecting piece 10. Therefore, it is easy to increase the thickness of these components in the axial direction, thereby increasing the flexural rigidity. Accordingly, the load for detachment prevention can be increased, and it is therefore possible to reliably prevent separation of the components of the strut bearing during transportation or the like.

Furthermore, the upper case 2 and the lower case 3 may be positioned within a predetermined angle range (e.g., the state shown in FIG. 3) other than the relative pivoting range of the upper case 2 and the lower case 3 in a use state of the strut bearing 1. This positioning eliminates the detachment preventing engagement portion C. Accordingly, the upper case 2 and the lower case 3 can be easily separated. Therefore, it is possible to improve the ease in maintenance of the strut bearing.

The embodiments described above are all illustrative and not restrictive. Various improvements and modifications can be devised without departing from the scope of the present invention.

REFERENCE SIGNS LIST

1 . . . Strut bearing
2 . . . Upper case
3 . . . Lower case
4 . . . Upper raceway ring
5 . . . Lower raceway ring
6 . . . Rolling element
7 . . . Retainer
8 . . . Core metal
9, 9A-9E . . . Outwardly projecting piece
10, 10A-10D . . . Inwardly projecting piece
11 . . . Base
12 . . . Outer diameter-side sealing member
13 . . . Inner diameter-side sealing member
14 . . . Strut
15 . . . Coil spring
16 . . . Spring insulator
17 . . . Upper mount
18 . . . Dust boot
A . . . Row of circumferentially-arranged outwardly projecting pieces
B . . . Row of circumferentially-arranged inwardly projecting pieces
C, C1-C5 . . . Detachment preventing engagement portion
D, E . . . Initial positioning projection
J . . . Rotation axis
R1 . . . Radially outward direction
R2 . . . Radially inward direction
S . . . Strut suspension

What is claimed is:

1. A strut bearing comprising:
an upper case to be fixed to an upper end portion of a strut of a vehicle strut suspension;
a lower case to be directly or indirectly connected to a coil spring disposed on an outer side of the strut;
an upper raceway ring held by the upper case;
a lower raceway ring held by the lower case; and
a rolling element that rolls between the upper raceway ring and the lower raceway ring,
the upper case and the lower case being made of a synthetic resin, wherein
within a relative pivoting range of the upper case and the lower case in a use state of the strut bearing, a detachment preventing engagement portion for preventing the upper case and the lower case from being separated from each other in an axial direction is provided, and
within a predetermined angle range outside the relative pivoting range, the detachment preventing engagement portion is not present.

2. The strut bearing according to claim 1, wherein:
the upper case is formed integrally from an upper case inner diameter side and an upper case outer diameter side, the upper case inner diameter side being proximate a rotation axis of the strut bearing relative to the upper case outer diameter side, the upper case outer diameter side being distal the upper case inner diameter side, relative to the rotation axis of the strut bearing; and
the lower case is formed integrally from a lower case inner diameter side and a lower case outer diameter side, the lower case inner diameter side being proximate a rotation axis of the strut bearing relative to the lower case outer diameter side, the lower case outer diameter side being distal the lower case inner diameter side, relative to the rotation axis of the strut bearing, the strut bearing further comprising:
on the upper case inner diameter side, an outwardly projecting piece that projects in a radially outward direction, or an outwardly-projecting piece row formed by a plurality of the outwardly projecting pieces provided discontinuously in a circumferential direction; and
on the lower case inner diameter side, an inwardly projecting piece that projects in a radially inward direction, or an inwardly-projecting piece row formed by a plurality of the inwardly projecting pieces provided discontinuously in the circumferential direction, wherein
within the relative pivoting range of the upper case and the lower case in the use state of the strut bearing, the detachment preventing engagement portion is provided by the outwardly projecting piece or the outwardly-projecting piece row of the upper case, and the inwardly projecting piece or the inwardly-projecting piece row of the lower case.

3. The strut bearing according to claim 1, wherein:
the upper case is formed integrally from an upper case inner diameter side and an upper case outer diameter side, the upper case inner diameter side being proximate a rotation axis of the strut bearing relative to the upper case outer diameter side, the upper case outer diameter side being distal the upper case inner diameter side, relative to the rotation axis of the strut bearing; and the lower case is formed integrally from a lower case inner diameter side and a lower case outer diameter side, the lower case inner diameter side being proximate a rotation axis of the strut bearing relative to the lower case outer diameter side, the lower case outer diameter side being distal the lower case inner diameter side, relative to the rotation axis of the strut bearing, the strut bearing further comprising:

on the upper case outer diameter side, an inwardly projecting piece that projects in a radially inward direction, or an inwardly-projecting piece row formed by a plurality of the inwardly projecting pieces provided discontinuously in a circumferential direction; and on the lower case outer diameter side, an outwardly projecting piece that projects in a radially outward direction, or an outwardly-projecting piece row formed by a plurality of the outwardly projecting pieces provided discontinuously in the circumferential direction, wherein within the relative pivoting range of the upper case and the lower case in the use state of the strut bearing, the detachment preventing engagement portion is provided by the inwardly projecting piece or the inwardly-projecting piece row of the upper case, and the outwardly projecting piece or the outwardly-projecting piece row of the lower case.

* * * * *